United States Patent
Dalal

(10) Patent No.: US 11,970,062 B2
(45) Date of Patent: Apr. 30, 2024

(54) SYSTEMS AND METHODS OF POWER ALLOCATION FOR HYBRID ELECTRIC ARCHITECTURE

(71) Applicant: GE Aviation Systems LLC, Grand Rapids, MI (US)

(72) Inventor: Manish Ashvinkumar Dalal, Dayton, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 390 days.

(21) Appl. No.: 15/479,495

(22) Filed: Apr. 5, 2017

(65) Prior Publication Data

US 2018/0291807 A1 Oct. 11, 2018

(51) Int. Cl.
*B60L 1/00* (2006.01)
*B60L 15/00* (2006.01)
(Continued)

(52) U.S. Cl.
CPC ............... *B60L 1/00* (2013.01); *B60L 15/007* (2013.01); *B60L 50/13* (2019.02); *B60L 50/15* (2019.02); *B60L 50/60* (2019.02); *B60L 50/61* (2019.02); *B64D 27/18* (2013.01); *B64D 27/24* (2013.01); *F01D 15/10* (2013.01); *F02C 6/00* (2013.01); *F02C 6/14* (2013.01); *F02C 6/20* (2013.01); *F02C 7/275* (2013.01); *F02C 7/32* (2013.01); *F02C 7/36* (2013.01); *F02K 5/00* (2013.01); *F02N 11/0866* (2013.01); *H02J 1/102* (2013.01); *H02J 7/34* (2013.01);
(Continued)

(58) Field of Classification Search
CPC ..... F02C 6/20; F02C 6/14; F02C 7/32; B64D 41/00; B64D 27/02; B64D 2027/026; F01D 15/10; H02J 7/34; B60L 11/18; F02N 11/0866; F05D 2270/20; B60Y 2200/51; B60Y 2200/92
See application file for complete search history.

(56) References Cited

U.S. PATENT DOCUMENTS 6,931,856 B2  8/2005 Belokon et al.
7,207,521 B2  4/2007 Atkey et al.
(Continued)

OTHER PUBLICATIONS

U.S. Appl. No. 15/077,178, filed Mar. 22, 2016.

*Primary Examiner* — Daniel Kessie
(74) *Attorney, Agent, or Firm* — Dority & Manning, P.A.

(57) ABSTRACT

Systems and method for an electrical system on an aircraft are provided. In example embodiments, the electrical system can be for an aircraft having a turbine engine. The turbine engine having a high pressure (HP) spool and a low pressure (LP) spool. The HP spool can be configured to drive a first generator to provide a first electrical output. The LP spool can be configured to drive a second generator to provide a second electrical output. The first generator and the second generator can be coupled to an electrical power distribution bus that provides electrical power to a load. A hybrid electric propulsion system and a secondary aircraft systems bus can both be coupled to the electrical power distribution bus. The electrical system can further include a control system configured to allocate power among the first generator, the second generator, and the hybrid electric propulsion system, and the secondary aircraft systems bus.

13 Claims, 5 Drawing Sheets

(51) Int. Cl.
*B60L 50/13* (2019.01)
*B60L 50/15* (2019.01)
*B60L 50/60* (2019.01)
*B60L 50/61* (2019.01)
*B64D 27/18* (2006.01)
*B64D 27/24* (2006.01)
*F01D 15/10* (2006.01)
*F02C 6/00* (2006.01)
*F02C 6/14* (2006.01)
*F02C 6/20* (2006.01)
*F02C 7/275* (2006.01)
*F02C 7/32* (2006.01)
*F02C 7/36* (2006.01)
*F02K 5/00* (2006.01)
*F02N 11/08* (2006.01)
*H02J 1/10* (2006.01)
*H02J 7/34* (2006.01)
*B64D 27/02* (2006.01)
*B64D 41/00* (2006.01)

(52) U.S. Cl.
CPC ....... *B60L 2200/10* (2013.01); *B60Y 2200/51* (2013.01); *B60Y 2200/92* (2013.01); *B64D 2027/026* (2013.01); *B64D 41/00* (2013.01); *B64D 2221/00* (2013.01); *F05D 2220/50* (2013.01); *F05D 2220/60* (2013.01); *F05D 2220/76* (2013.01); *F05D 2240/40* (2013.01); *F05D 2270/20* (2013.01); *Y02T 10/70* (2013.01)

(56) References Cited

U.S. PATENT DOCUMENTS

| | | | |
|---|---|---|---|
| 7,285,871 B2 | 10/2007 | Derouineau | |
| 7,468,561 B2 | 12/2008 | Kern et al. | |
| 7,605,483 B2 | 10/2009 | Kern et al. | |
| 7,936,086 B2 | 5/2011 | Yue et al. | |
| 7,950,606 B2 | 5/2011 | Atkey et al. | |
| 8,393,565 B2 | 3/2013 | Frank et al. | |
| 8,738,268 B2 | 5/2014 | Karimi et al. | |
| 8,757,542 B2 | 6/2014 | Hopdjanian et al. | |
| 8,829,707 B2 | 9/2014 | Krenz et al. | |
| 9,162,771 B2 | 10/2015 | Roggemans et al. | |
| 9,169,027 B2 | 10/2015 | Strauss et al. | |
| 9,260,976 B2 | 2/2016 | Phillips et al. | |
| 9,458,770 B2 | 10/2016 | Anghel et al. | |
| 9,963,095 B2 | 5/2018 | Huang et al. | |
| 10,000,293 B2 | 6/2018 | Hamel et al. | |
| 10,279,759 B2 | 5/2019 | Iwashima et al. | |
| 2005/0006954 A1 | 1/2005 | Bowman et al. | |
| 2006/0042846 A1* | 3/2006 | Kojori | G05B 9/03 180/65.8 |
| 2006/0174629 A1 | 8/2006 | Michalko | |
| 2007/0137216 A1 | 6/2007 | Joshi et al. | |
| 2009/0206059 A1* | 8/2009 | Kiko | H02J 13/00017 218/143 |
| 2010/0251726 A1 | 10/2010 | Jones et al. | |
| 2013/0062885 A1 | 3/2013 | Taneja | |
| 2013/0076120 A1* | 3/2013 | Wagner | F01D 15/10 307/9.1 |
| 2013/0099560 A1 | 4/2013 | Shipley et al. | |
| 2013/0111917 A1* | 5/2013 | Ho | F02C 3/13 60/773 |
| 2013/0147192 A1* | 6/2013 | Condon | F02C 7/268 290/34 |
| 2014/0346283 A1 | 11/2014 | Salyer | |
| 2014/0360205 A1* | 12/2014 | French | F02K 3/06 290/46 |
| 2016/0163209 A1* | 6/2016 | Zhou | G08G 5/0026 701/117 |
| 2016/0236790 A1* | 8/2016 | Knapp | G01C 21/20 |
| 2016/0304214 A1* | 10/2016 | Himmelmann | F02C 6/206 |
| 2016/0359324 A1* | 12/2016 | Knowles | H02J 4/00 |
| 2016/0362999 A1* | 12/2016 | Ho | F01D 5/02 |
| 2018/0145497 A1* | 5/2018 | Jakupi | H02H 3/05 |
| 2018/0155040 A1* | 6/2018 | Armstrong | F02K 3/00 |
| 2018/0269689 A1* | 9/2018 | Rodriguez | H02J 3/381 |

* cited by examiner

SYSTEMS AND METHODS OF POWER ALLOCATION FOR HYBRID ELECTRIC ARCHITECTURE

FIELD

The present subject matter relates generally to a power system for an aircraft.

BACKGROUND

A conventional commercial aircraft generally includes a fuselage, a pair of wings, and a propulsion system that provides thrust. The propulsion system includes at least two aircraft engines, such as turbofan jet engines. Each turbofan jet engine can be mounted to a respective one of the wings of the aircraft, such as in a suspended position beneath the wing.

More recently, hybrid electric designs have been proposed for propulsion systems. With these hybrid electric propulsion systems, an electric power source may provide electric power to an engine fan or propeller and thereby augment propulsion. Typically, electric power systems can operate at relatively low voltages (e.g., at or below 270 volts DC or 230 volts AC). With increased electrical loads for commercial and military aircraft, future aircrafts may need more electrical power.

BRIEF DESCRIPTION

Aspects and advantages of embodiments of the present disclosure will be set forth in part in the following description, or can be learned from the description, or can be learned through practice of the embodiments.

One example aspect of the present disclosure is directed to an electrical system for an aircraft having a turbine engine. The turbine engine having a high pressure (HP) spool and a low pressure (LP) spool. The electrical system includes a first generator driven by the HP spool and providing a first electrical output. The electrical system further includes a second generator driven by the LP spool and providing a second electrical output. The first generator and the second generator can be coupled to an electrical power distribution bus that provides electrical power to a load. A hybrid electric propulsion system can be coupled to the electrical power distribution bus. A secondary aircraft systems bus can be coupled to the electrical power distribution bus. The electrical system further includes a control system configured to allocate power among a first generator, a second generator, the hybrid electric propulsion system, and the secondary aircraft systems bus.

Another example aspect of the present disclosure is directed to an aircraft. The aircraft includes a turbine engine. The turbine engine having a high pressure (HP) spool and a low pressure (LP) spool. The HP spool can be configured to drive a first generator and provide a first electrical output. The LP spool can be configured to drive a second generator and provide a second electrical output. The first generator and the second generator can be coupled to an electrical power distribution bus that provides electrical power to a load. The aircraft further includes a hybrid electric propulsion system. The hybrid electric propulsion system can be coupled to the electrical power distribution bus. A secondary aircraft systems bus can be coupled to the electrical power distribution bus. The aircraft further includes a control system configured to allocate power among the first generator, the second generator, the hybrid electric propulsion system, and the secondary aircraft systems bus.

Yet another example aspect of the present disclosure is directed to a method of powering an aircraft system having a turbine engine. The turbine engine having a high pressure (HP) spool and a low pressure (LP) spool. The HP spool can be configured to drive a first generator and provide a first electrical output. The LP spool can be configured to drive a second generator and provide a second electrical output. The method further includes providing the first electrical output from the first generator to an electrical power distribution bus. The method further includes providing the second electrical output from the second generator to the electrical power distribution bus. The method further includes coupling a hybrid electric propulsion system to the electrical power distribution bus. The method further includes coupling a secondary aircraft systems bus to the power distribution bus. The method further includes managing, by a control system, a power allocation among the first generator, the second generator, the hybrid electric propulsion system, and the secondary aircraft systems bus.

Variations and modifications can be made to these example embodiments. These and other features, aspects and advantages of various embodiments will become better understood with reference to the following description and appended claims. The accompanying drawings, which are incorporated in and constitute a part of this specification, illustrate embodiments of the present disclosure and together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
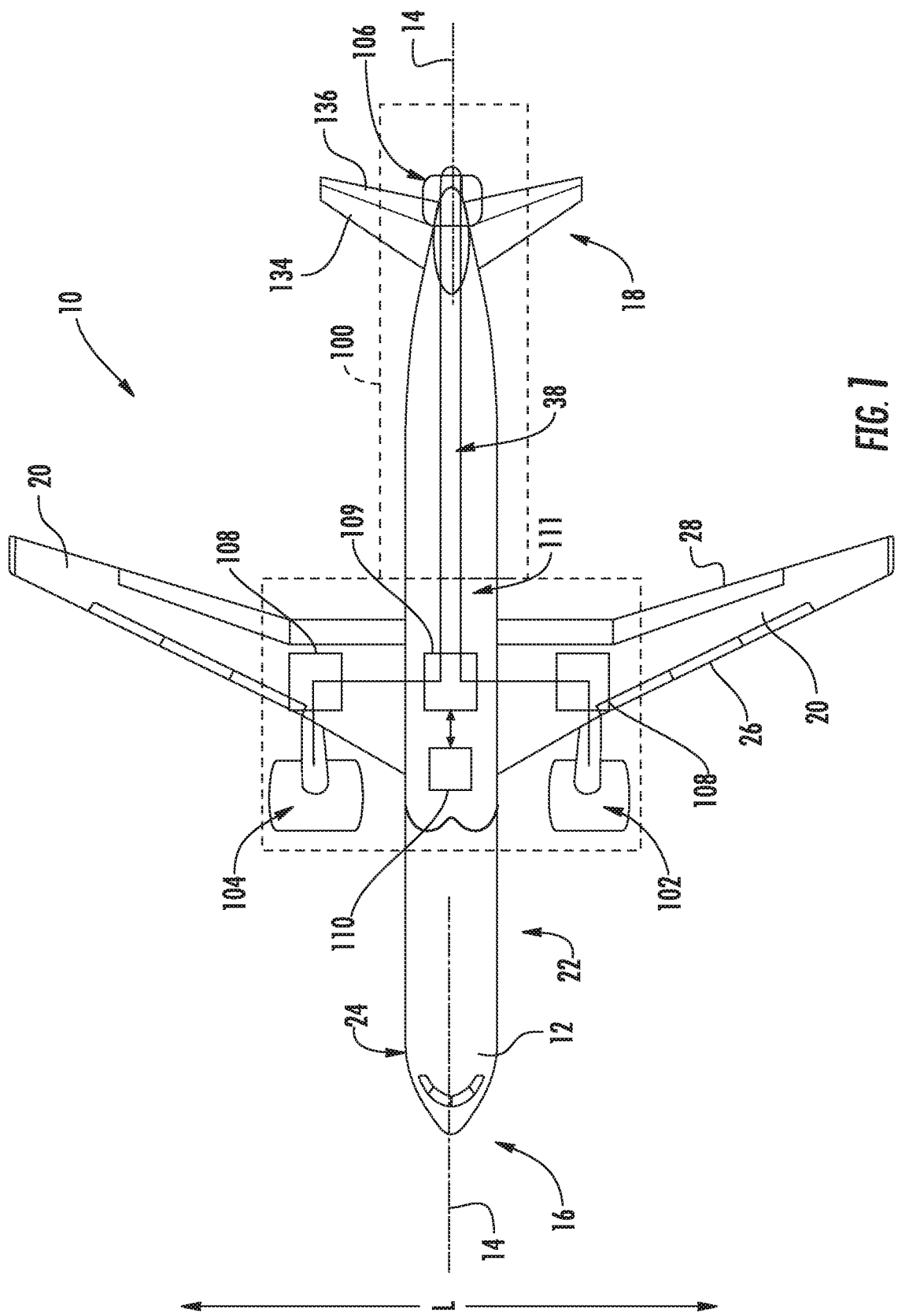
FIG. 1 depicts a top view of an aircraft according to example embodiments of the present disclosure.

Reference now will be made in detail to embodiments of the present disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to an electrical system for an aircraft. In commercial aircraft applications, a hybrid electric propulsion system can provide fuel savings by electrically controlling propellers to improve aerodynamic performance (reducing drag). Depending on the size of a platform, the electrical power generation needed to enable a hybrid electric architecture could be a few hundred kilowatts or a few megawatts. An aircraft electrical system that can leverage the available hybrid electric power system so that it can be used for secondary aircraft systems, (e.g., flight controls, gallery loads, and electrical actuators) can improve aircraft performance.

According to example aspects of the present disclosure, a hybrid electric propulsion system and secondary aircraft systems of an aircraft can both be coupled to the same electrical power bus. In example embodiments, a control system can be implemented to manage power allocation between a first generator, a second generator, a hybrid electric propulsion system, and a secondary aircraft systems bus. As a result, the present disclosure can provide multiple degrees of freedom to adjust different systems' around a common bus as needed. For instance, in a multi-spool aircraft, one degree of freedom can allow for splitting the source of electrical power between spools as needed. A second degree of freedom can allow for the power to be split between the hybrid electric propulsion system and secondary aircraft systems. As a result, the need for separate power generators/gearbox to provide power to secondary aircraft systems can be reduced.

According to example embodiments of the present disclosure, a high pressure (HP) spool and a low pressure (LP) spool can be configured to drive a first generator and a second generator. The output power from the first generator and second generator can be provided to an electrical power distribution bus that provides power to a load. The electrical load could be a combination of hybrid electric propulsion system and secondary aircraft systems. The hybrid electric propulsion system and a secondary aircraft systems bus can be coupled to the electrical power distribution bus. A control system can be configured to manage electrical power from the power sources (e.g., the HP and LP generator systems) to improve allocation of available power.

In this way, example aspects of the present disclosure can provide a number of technical effects and benefits. For instance, managing a power split between the hybrid electric propulsion system and secondary aircraft systems can help improve full flight performance while achieving better fuel efficiency. Multi-spool power extraction from the engine can enable full-flight envelope performance by providing sufficient engine stall margin during corner point operating conditions of the flight envelope. The power distribution feeder cable weight can be reduced by tapping a high voltage hybrid power bus to get power for secondary systems. Interface and controls between control systems (e.g., bus power control unit, propulsion system controller, full authority digital engine controller) can improve system performance balancing fuel efficiency and full-flight operability. If a battery is onboard, it can be used for emergency conditions (e.g., engine failures) to provide power for flight controls and secondary loads to land safely thereby reducing the need for separate emergency power source.

Referring now to the figures, example aspects of the present disclosure will be discussed in greater detail. As used herein, the term "about," when used in reference to a numerical value is intended to refer to within 30% of the numerical value. As used in the specification and the appended claims, the singular forms "a," "an," and "the" include plural referents unless the context clearly dictates otherwise.

FIG. 1 depicts a top view of an example aircraft 10 according to example embodiments of the present disclosure. The aircraft defines a longitudinal centerline 14 that extends there through, a vertical direction V, a lateral direction, L, a forward end 16, and an aft end 18. Moreover, the aircraft 10 defines a mean line extending between the forward end 16 and aft end 18 of the aircraft 10. As used herein, the "mean line" refers to a midpoint line extending along a length of the aircraft 10, not taking into account the appendages of the aircraft 10 (such as the wings 20 and stabilizers discussed below).

Moreover, the aircraft 10 includes a fuselage 12, extending longitudinally from the forward end 16 of the aircraft towards the aft end 18 of the aircraft 10, and a pair of wings 20. As used herein, the term "fuselage" generally includes all of the body of the aircraft 10, such as an empennage of the aircraft 10. The first such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the example embodiment depicted includes one or more leading edge flaps 26 and one or more trailing edge flaps 28. The aircraft 10 further includes a vertical stabilizer having a rudder flap for yaw control, and a pair of horizontal stabilizers 134, each having an elevator flap 136 for pitch control. The fuselage 12 additionally includes an outer surface or skin 38. It should be appreciated however, that in other example embodiments of the present disclosure, the aircraft 10 may additionally or alternatively include any other suitable configuration of stabilizer that may or may not extend directly along the vertical direction V or horizontal/lateral direction L.

The example aircraft 10 of FIG. 1 includes a propulsion system 100, herein referred to as "system 100." The example system 100 includes one or more aircraft engines and one or more electric propulsion engines. For example, the embodiment depicted includes a plurality of aircraft engines, each configured to be mounted to the aircraft 10, such as to one of the pair of wings 20, and an electric propulsion engine. More specifically, for the embodiment depicted, the aircraft engines are configured as gas turbine engines, or rather as turbofan jet engines 102, 104 attached to and suspended beneath the wings 20 in an under-wing configuration. Additionally, the electric propulsion fan is configured to be mounted at the aft end of the aircraft 10, and hence the electric propulsion fan depicted may be referred to as an "aft BLI fan." Further, the electric propulsion engine depicted is configured to ingest and consume air forming a boundary layer over the fuselage 12 of the aircraft 10. Accordingly, the example aft engine depicted may be referred to as a boundary layer ingestion (BLI) fan 106. The BLI fan 106 is mounted to the aircraft 10 at a location aft of the wings 20 and/or the jet engines 102, 104. Specifically, for the embodiment depicted, the BLI fan 106 is fixedly connected to the fuselage 12 at the aft end 18, such that the BLI fan 106 is incorporated into or blended with a tail section at the aft end 18, and such that the mean line extends there through. It should be appreciated, however, that in other embodiments the electric propulsion engine may be configured in any other suitable manner, and may not necessarily be configured as an aft fan or as a BLI fan.

In other example embodiments, the propulsion system 100 further includes one or more electric generators 108 operable with the jet engines 102, 104. For example, one or both of the jet engines 102, 104 may be configured to provide mechanical power from a rotating shaft (such as an LP shaft or HP shaft) to the electric generators 108. Although depicted schematically outside the respective jet engines 102, 104, in certain embodiments, the electric generators 108 may be positioned within a respective jet engine 102, 104. Additionally, the electric generators 108 may be configured to convert the mechanical power to electrical power. For the embodiment depicted, the propulsion system 100 includes an electric generator 108 for each jet engine 102, 104 and also includes a power conditioner 109 and an energy storage device 110. The electric generator 108 may send electrical power to the power conditioner 109, which may transform the electrical energy to a proper form and either store the energy in the energy storage device 110 or send the electrical energy to the BLI fan 106. For the embodiment depicted, the electric generators 108, power conditioner 109, energy storage device 110, and BLI fan 106 are all connected to an electric communication bus 111, such that the electric generator 108 may be in electrical communication with the BLI fan 106 and/or the energy storage device 110, and such that the electric generator 108 may provide electrical power to one or both of the energy storage device 110 or the BLI fan 106. Accordingly, in such an embodiment, the propulsion system 100 may be referred to as a gas-electric or hybrid electric propulsion system.

It should be appreciated, however, that aircraft 10 and propulsion system 100 depicted in FIG. 1 is provided by way of example only and that in other example embodiments of the present disclosure, any other suitable aircraft 10 may be provided having a propulsion system 100 configured in any other suitable manner. For example, it should be appreciated that in various other embodiments, the BLI fan 106 may alternatively be positioned at any suitable location of the aircraft 10 to provide BLI (Boundary Layer Ingestion). Further, in still other embodiments the electric propulsion engine may not be positioned at the aft end of the aircraft 10, and thus may not be configured as an "aft engine." For example, in other embodiments, the electric propulsion engine may be incorporated into the fuselage 12 of the aircraft 10, and thus configured as a "podded engine," or pod-installation engine. Further, in still other embodiments, the electric propulsion engine may be incorporated into a wing of the aircraft 10, and thus may be configured as a "blended wing engine." The propulsion system 100 can have one or more propulsion system controller(s) (PSC) 320 to control electrical power to the different components. Moreover, in other embodiments, the electric propulsion engine may not be a boundary layer ingestion fan, and instead may be mounted at any suitable location on the aircraft 10 as a freestream injection fan. Furthermore, in still other embodiments, the propulsion system 100 may not include, e.g., the power conditioner 109 and/or the energy storage device 110, and instead the generator(s) 108 may be directly connected to electric motor that drives the BLI fan 106.

Figure 2:
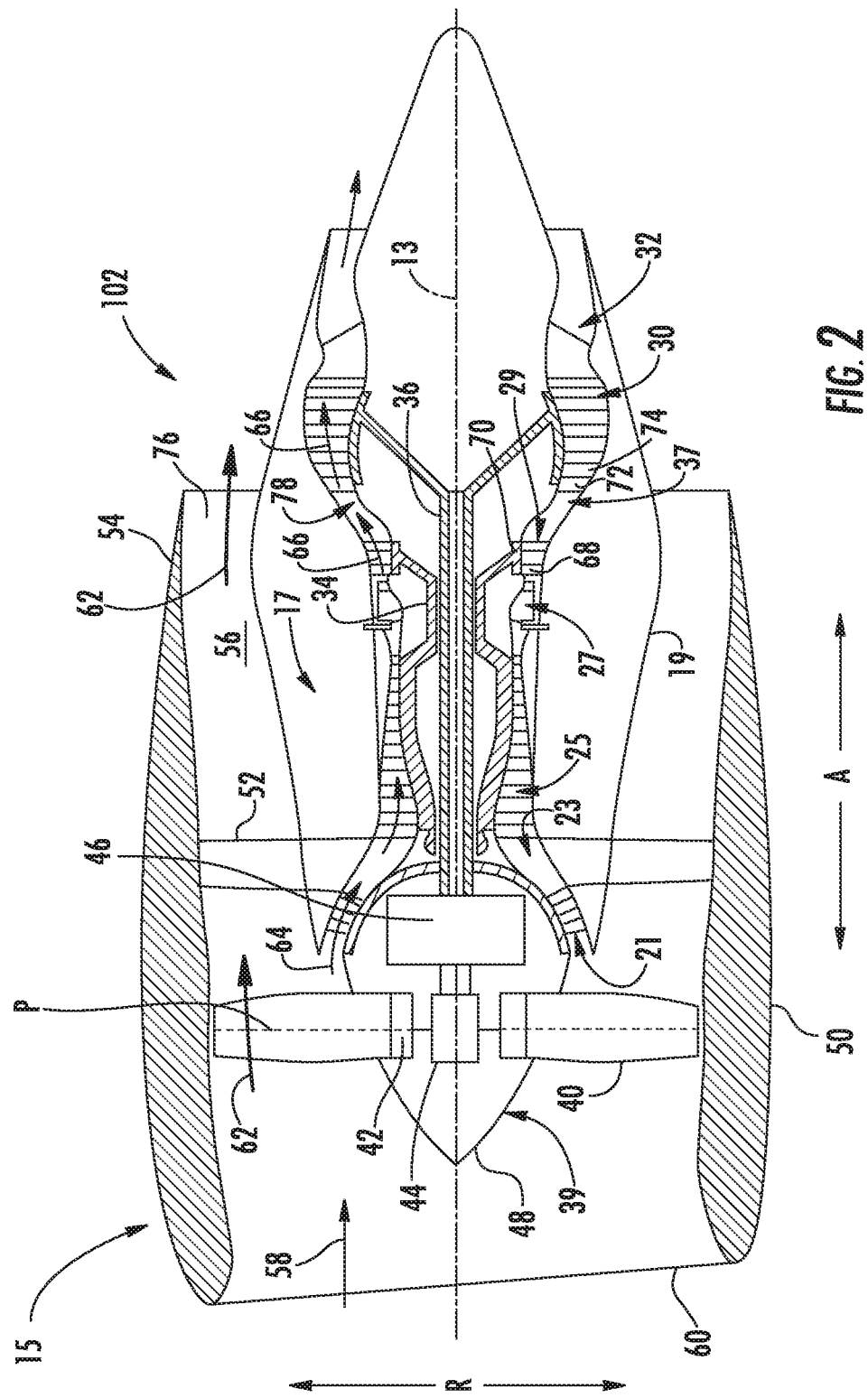
FIG. 2 depicts a schematic cross-sectional view of an example gas turbine engine according to example embodiments of the present disclosure.

FIG. 2 depicts a schematic cross-section view of a gas turbine engine in accordance with an example embodiment of the present disclosure. More particularly, for the embodiment of FIG. 2, the gas turbine engine is an aeronautical, high-bypass turbofan jet engine 102, referred to herein as "turbofan engine 102", configured to be mounted to an aircraft, such as in an under-wing configuration or tail-mounted configuration. As shown in FIG. 2, the turbofan engine 102 defines an axial direction A (extending parallel to a longitudinal centerline 13 provided for reference), a radial direction R, and a circumferential direction (i.e., a direction extending about the axial direction A). In general, the turbofan 102 includes a fan section 15 and a core turbine engine 17 disposed downstream from the fan section 15.

The example core turbine engine 17 depicted generally includes a substantially tubular outer casing 19 that defines an annular inlet 21. The outer casing 19 encases, in serial flow relationship, a compressor section including a first, booster or low pressure (LP) compressor 23 and a second, high pressure (HP) compressor 25; a combustion section 27; a turbine section including a first, high pressure (HP) turbine 29 and a second, low pressure (LP) turbine 30; and a jet exhaust nozzle section 32. A high pressure (HP) shaft or spool 34 drivingly connects the HP turbine 29 to the HP compressor 25. A low pressure (LP) shaft or spool 36 drivingly connects the LP turbine 30 to the LP compressor 23. The compressor section, combustion section 27, turbine section, and jet exhaust nozzle section 32 together define a core air flow path 37 through the core turbine engine 17.

The fan section 15 includes a variable pitch fan 39 having a plurality of fan blades 40 coupled to a disk 42 in a spaced apart manner. As depicted, the fan blades 40 extends outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40, e.g., in unison. The fan blades 40, disk 42, and actuation member 44 are together rotatable about the longitudinal axis 13 by LP shaft 36 across a power gear box 46. The power gear box 46 includes a plurality of gears for stepping down the rotational speed of the LP shaft 36 to a more efficient rotational fan speed.

The disk 42 is covered by rotatable front nacelle 48 aerodynamically contoured to promote an airflow through the plurality of fan blades 40. Additionally, the example fan section 15 includes an annular fan casing or outer nacelle 50 that circumferentially surrounds the fan 39 and/or at least a portion of the core turbine engine 17. Moreover, for the embodiment depicted, the nacelle 50 is supported relative to the core turbine engine 17 by a plurality of circumferentially-spaced outlet guide vanes 52. Further, a downstream section 54 of the nacelle 50 extends over an outer portion of the core turbine engine 17 so as to define a bypass airflow passage 56 there between.

During operation of the turbofan engine 102, a volume of air 58 enters the turbofan through an associated inlet 60 of the nacelle 50 and/or fan section 15. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 23. The ratio between the first portion of air 62 and the second portion of air 64 is commonly known as a bypass ration. The pressure of the second portion of air 64 is then increased as it is routed through the high pressure (HP) compressor 25 and into the combustion section 27.

The compressed second portion of air 64 from the compressor section mixes with fuel and is burned within the combustion section to provide combustion gases 66. The combustion gases are routed from the combustion section 27, through the HP turbine 29 where a portion of thermal and/or kinetic energy from the combustion gases 66 is extracted via sequential stages of HP turbine stator vanes 68 that are coupled to the outer casing 19 and HP turbine rotor blades 70 that are coupled to the HP shaft or spool 34, thus causing the HP shaft or spool 34 to rotate, thereby supporting operation of the HP compressor 25. The combustion gases 66 are then routed through the LP turbine 30 where a second portion of thermal and kinetic energy is extracted from the combustion gases 66 via sequential stages of LP turbine stator vanes 72 that are coupled to the outer casing 19 and LP turbine rotor blades 74 that are coupled to the LP shaft or spool 36, thus causing the LP shaft or spool 36 to rotate, thereby supporting operation of the LP compressor 23 and/or rotation of the fan 39.

The combustion gases 66 are subsequently routed through the jet exhaust nozzle section 32 of the core turbine engine 17 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 102, also providing propulsive thrust. The HP turbine 29, the LP turbine 30, and the jet exhaust nozzle section 32 at least partially define a hot gas path 78 for routing the combustion gases 66 through the core turbine engine 17.

It should be appreciated that the example turbofan engine 102 depicted in FIG. 2 is provided by way of example only, and that in other example embodiments, the turbofan engine 102 may have any other suitable configuration. Additionally, or alternatively, aspects of the present disclosure may be utilized with any other suitable aeronautical gas turbine engine, such as turboshaft engine, turboprop engine, turbojet engine, etc. Further, aspects of the present disclosure may further be utilized with any other land-based gas turbine engine, such as a power generation gas turbine engine, or any aero derivative gas turbine engine, such as a nautical gas turbine engine.

Figure 3:
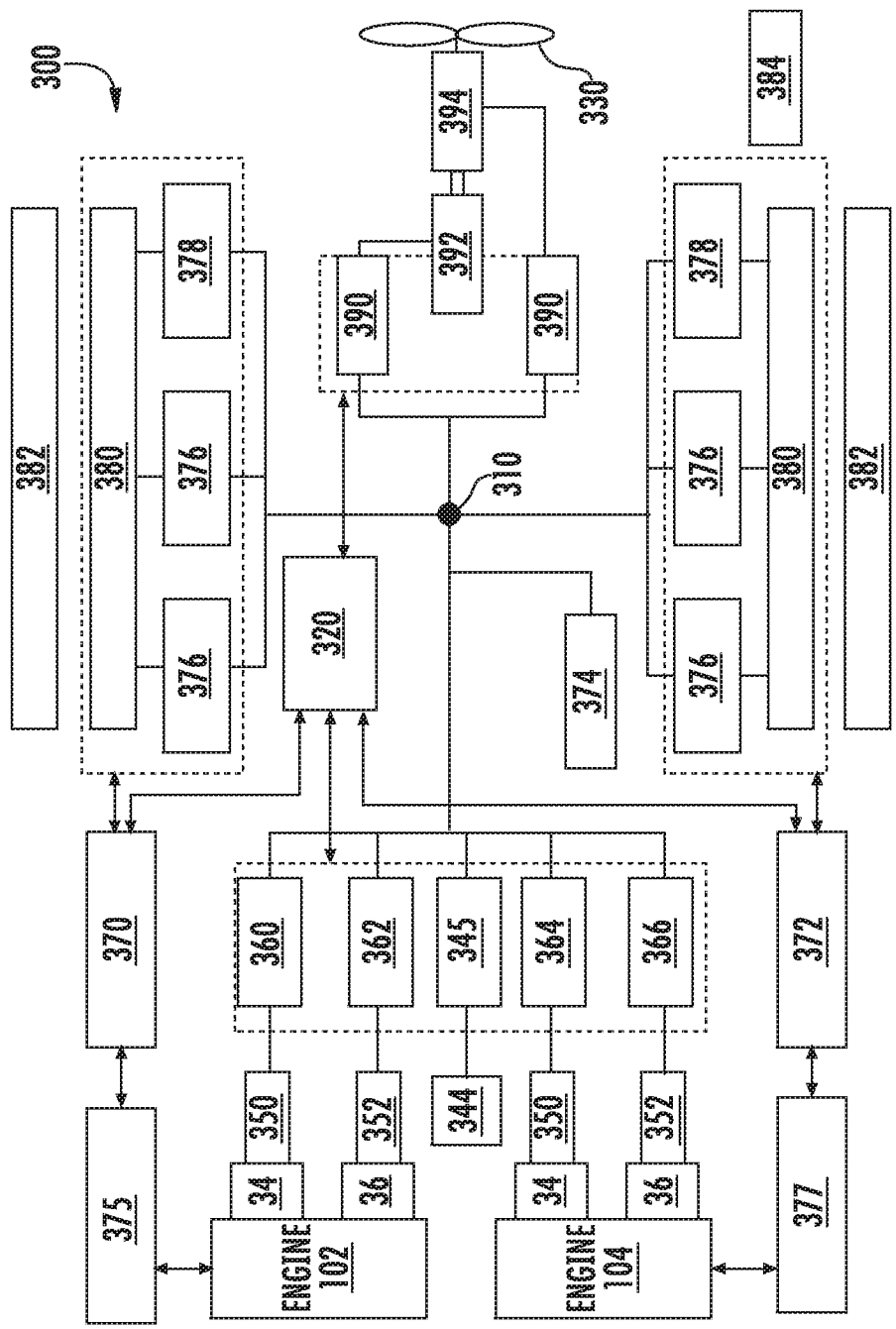
FIG. 3 depicts a circuit diagram of a dual-spool electrical system according to example embodiments of the present disclosure.

FIG. 3 depicts a circuit diagram of a dual-spool electrical system 300 according to example embodiments of the present disclosure. Electrical system 300 can include engines 102, 104. Engines 102, 104 can be gas turbine engines as described above in FIG. 2. Engines 102, 104 can include a HP spool 34 and a LP spool 36. The HP spool 34 can be configured to drive a first generator 350 and provide a first electrical output. The LP spool 36 can be configured to drive a second generator 352 and provide a second electrical output. In example embodiments, the HP spool 34 can be used as a starter generator to provide in-air cross-engine electric start. Thus, engines 102, 104 can be started from the HP spool 34 only. According to example embodiments, the HP 34 and LP 36 generators on each engine can be rated for 250 kW and 750 kW respectively. Therefore, each engine can provide about 1 MW electric power output through these generators. The electrical output from the first generator 350 can be fed to converters 360, 364. The electrical output from the second generator 352 can be fed to converters 362, 366. The converters can be used to convert AC power generated by the first and second generators 350, 352 to DC power to be provided to an electrical power distribution bus 310.

A control system 210 (e.g., a control system comprising one or more controllers) can be used to control electrical power flow. As shown in FIG. 3, PSC 320 can be configured to receive signals from converters 360, 362, 364, 366. For instance, PSC 320 can be used to control electrical power from engines 102, 104. According to example embodiments of the present disclosure, PSC 320 can be coupled to electrical power distribution bus 310 to provide power to the hybrid electric propulsion system 100. In other embodiments, PSC 320 can be configured to control power allocation among the first generator 350, the second generator 352, and the hybrid electric propulsion system 100. There can be as many PSC 320 as needed. FIG. 3 shows one PSC 320 for simplification.

As shown in FIG. 3, bus power control units (BPCUs) 370, 372 can be used to control power delivery from the electrical power distribution bus 310 to a secondary aircraft systems bus 380. In other example embodiments, BPCUs 370, 372 and PSC 320 can command the power resources (e.g., HP and LP generator systems) to provide power to propulsion system 100 and secondary aircraft systems to ensure full flight envelope performance. In other example embodiments, BPCUs 370, 372 can be configured to manage a power split among the first generator 350 and the second generator 352. In other example embodiments, BPCUs 370, 372 can be used to allocate power to the secondary aircraft systems bus 380 from the power distribution bus 310. BPCUs 370, 372 can be controllers in a control system such as control system 210 as described in FIG. 5. BPCUs 370, 372 can communicate with each other and can also communicate with other controllers in the electrical system (e.g., PSC).

BPCUs 370, 372 can also communicate with a vehicle management system (VMS) and a full authority digital engine controllers (FADECs) 375, 377 to improve overall flight envelope performance. For instance, FADEC 375 can be configured to communicate with engine 102 to monitor various engine parameters (e.g., flow, temperature, pressure, speed, etc.). In other example embodiments, FADECs 375, 377 can be configured to control all aspects of engines 102,104 (e.g., fuel consumption, speed, thrust, and other key parameters of the engines). There can be as many BPCUs and FADECs as needed. FIG. 3 shows two BPCUs 370, 372 and two FADECs 375, 377 for simplification. The controllers can be in a variety of different arrangements based on installation, weight impact, etc.

The secondary aircraft systems bus 380 can include DC-DC converters 376 and DC-AC inverter 378. DC-DC converters 376 can be implemented to convert the high voltage (e.g., ±960 Vdc) from a hybrid electric bus to the power needs for secondary systems (e.g., 270 Vdc). In example embodiments, the electrical system 300 can include DC-AC inverters 378 configured to provide AC power to one or more AC loads on the aircraft. For instance, DC-AC inverter 378 can convert the high voltage DC power from the hybrid electric bus (e.g., ±960 Vdc) to a required AC power (e.g., 115 Vac, 3-phase, 40 Hz) to be delivered to AC loads. There can be multiple DC-DC converters 376 and DC-AC 378 converters depending on load analysis, redundancy needs and architecture definition. The secondary systems can also include flight critical and non-critical loads 382. Electrical system 300 can also include electrical accumulator unit (EAU) 384 to supplement the HP/LP 34/36 generator output power to provide transient performance and an electric start during an engine failure (e.g., act as a microgrid).

Electrical system 300 can include a battery energy storage system 374. The battery energy storage system 374 can be coupled to the electrical power distribution bus 310. The battery energy storage system 374 can include a battery energy storage device configured to supply a battery power. The power supplied by the battery energy storage system 374 can be managed using PSC/BPCU controllers. For example, PSC 320 can be configured to manage the battery power from the battery energy storage system 374 to provide electrical power to the electrical power distribution bus 310 to supplement the power supplied by the first generator 350 and second generator 352.

Electrical system 300 can include auxiliary power unit (APU) 344. The APU can be configured to supply auxiliary power. The power supplied by APU 344 can be provided to converter 345 to convert the auxiliary power provided by APU 344 to a power that is suitable for power distribution bus 310 (e.g., convert from AC power to DC power). According to example embodiments, PSC/BPCU controllers can be configured to allocate auxiliary power to supplement the power supplied by the first generator 350 and the second generator 352. Other backup generators or ram air turbine generators (RAT) can be used for an emergency generator system.

Electrical system 300 can include one or more power converters 390 coupled to the electrical power distribution bus 310. Power converters 390 can be configured to convert DC power from the electrical power distribution bus 310 to a power suitable for an aircraft load. For example, the electrical power converters 390 can be configured to supply electrical power to motors 392, 394 to drive propeller fan 330.

Figure 4:
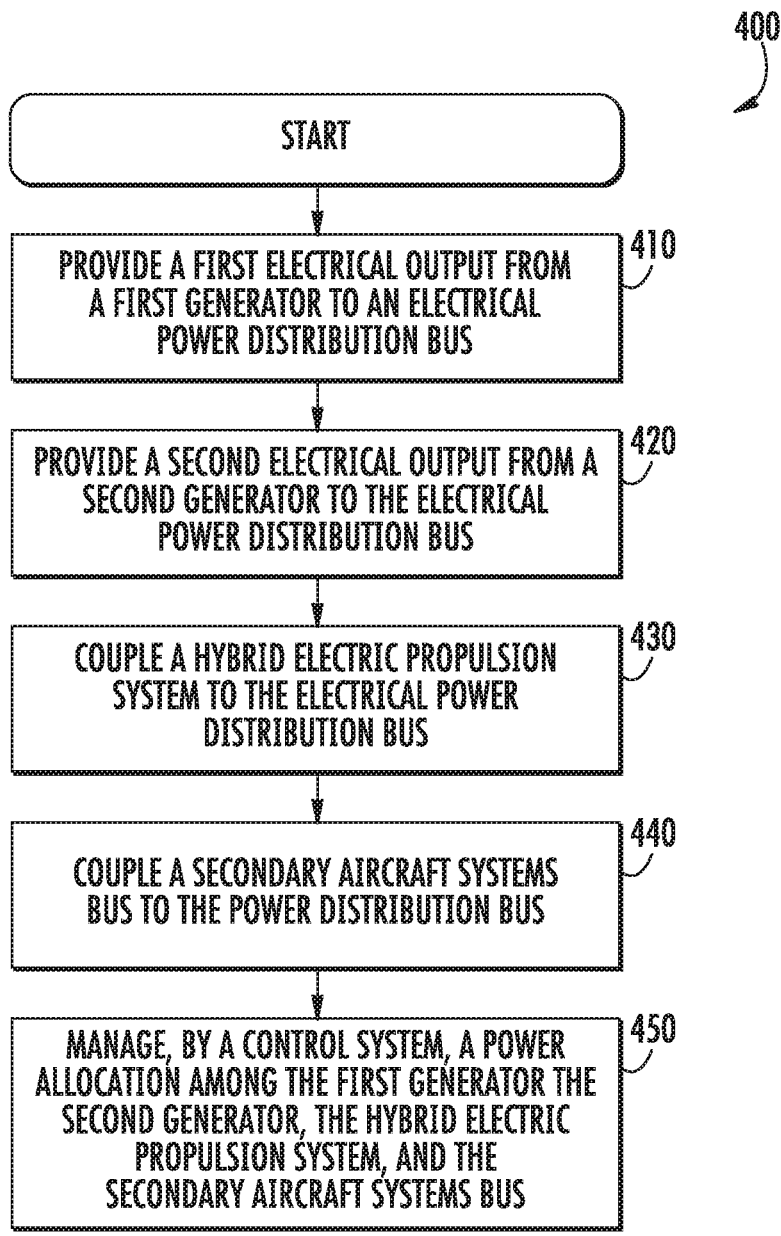
FIG. 4 depicts a flow diagram of an example method according to example embodiments of the present disclosure.

FIG. 4 depicts a flow diagram of an example method 400 according to example embodiments of the present disclosure. FIG. 4 depicts steps performed in a particular order for purposes of illustration and discussion. Those of ordinary skill in the art, using the disclosure provided herein, will understand that the method discussed herein can be adapted, rearranged, expanded, omitted, performed simultaneously, or modified in various ways without deviating from the scope of the present disclosure. Method 400 can be performed using control system 210.

At (410) the method can include providing a first electrical output from a first generator to an electrical power distribution bus 310. PSC 320 can be used to control electrical output from the first generator 350. Converters 360, 362, 364, and 366 can be used to convert electrical output from the first generator 350 into power suitable for the electrical power distribution bus 310 (e.g., convert AC power from the generator to DC power).

At (420) the method can include providing a second electrical output from a second generator 352 to the electrical power distribution bus 310. PSC 320 can be used to control electrical power from the second generator 352 to the electrical power distribution bus 310.

At (430) the method can include coupling a hybrid electric propulsion system 100 to the electrical power distribution bus 310. The hybrid electric propulsion system 100 can include PSC 320. PSC 320 can be used to control the power allocated to the hybrid electric propulsion system 100. PSC 320 can also be used to provide power to electrical power converters 390. Electrical power converters 390 can convert the DC power received from the power distribution bus 310 to a power suitable for an aircraft load (e.g., motors 392, 394).

At (440) the method can include coupling a secondary aircraft systems bus 380 to the power distribution bus 310. In example embodiments, BPCUs 370, 372 can be used to control power to the secondary aircraft systems bus 380. The secondary aircraft systems bus 380 can include DC-DC converters 376 and DC-AC converters 378. Secondary aircraft systems can include flight controls, galley loads, and electrical actuators. Secondary aircraft systems can also include flight critical and non-critical loads 382. As shown in FIG. 3, BPCUs 370, 372 can be used to manage the power allocation to secondary aircraft systems.

At (450) the method can include managing, by a control system 210, a power allocation among the first generator 350, the second generator 352, the hybrid electric propulsion system 100, and the secondary aircraft systems bus 380. According to example embodiments, the electrical system 300 can leverage the available multi-spool power extraction to improve energy sources for the propulsion system 100 and secondary aircraft systems. The power allocation can be achieved by intelligent controllers such as PSC 320 and BPCUs 370, 372. The PSC 320 and BPCUs 370, 372 can interface with FADECs 375, 377. These controllers can work together to command the power sources (e.g., HP and LP generator systems) to provide the required power for propulsion and secondary aircraft systems. For example, PSC 320 can be used to allocate power among the first generator 350, the second generator 352, and the hybrid electric propulsion system 100. In other example embodiments, BPCUs 370, 372 can be used to allocate power among secondary aircraft systems. For instance, the power allocation can be managed depending on phase of the flight envelope (e.g. taxi, take off, climb, cruise, descent, land, etc.). In other example embodiments, the power allocation can be determined depending on secondary aircraft load demand and depending on emergency conditions (e.g., single engine failure). This method of power allocation can be changed at any time during the flight phase based on a number of conditions. This method of power allocation provides an efficient usage of available power instead of dedicated separate power sources for hybrid electric propulsion 100 and secondary systems 380. Management of electrical power from HP 34 and LP 36 spool of each engine and management of electric power split between electric hybrid propulsion 100 and secondary systems can help to improve full flight performance while achieving greater fuel efficiency.

Figure 5:
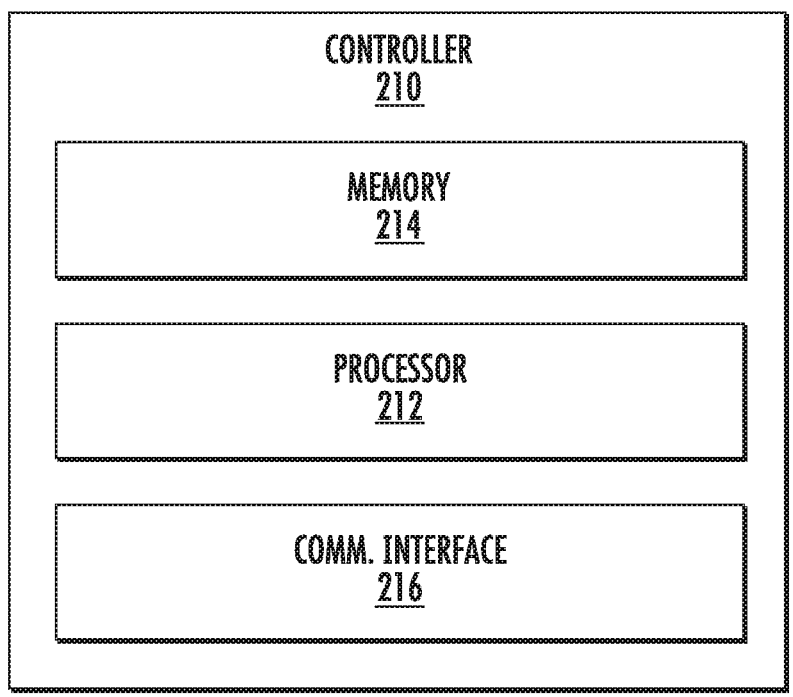
FIG. 5 depicts an example control system according to example embodiments of the present disclosure.

FIG. 5 depicts an example control system 210 (e.g., one or more controllers) according to aspects of the present disclosure. In general, the controller 210 may correspond to any suitable processor-based device, including one or more computing devices. For instance, FIG. 3 illustrates one embodiment of suitable components that may be included within the control system 210. The control system 210 can include one or more processors(s) 212 and one or more memory devices(s) 214. The one or more processors(s) 212 can include any suitable processing device, such as a microprocessor, micro-control device, integrated circuit, logic device, and/or other suitable processing device. The one or more memory devices(s) 214 can include one or more computer-readable media, including, but not limited to, non-transitory computer-readable media, RAM, ROM, hard drives, flash drives, and/or other memory devices.

The one or more memory device(s) 214 can store information accessible by the one or more processor(s) 212, including computer-readable instructions that can be executed by the one or more processors(s) 212. The instructions can be any set of instructions that when executed by the one or more processors(s) 212, cause the one or more processors(s) 212 to perform operations. In some embodiments, the instructions can be executed by the one or more processor(s) 212, to cause the one or more processors(s) 212 to perform operations. In some embodiments, the instructions can be executed by the one or more processor(s) 212 to cause the one or more processor(s) to perform operations, such as any of the operations and functions for which the control system 210 is configured. For instance, the operations can be used for performing method (400), as described herein, and/or any other operations or functions of the one or more control system 210. The instructions can be software written in any suitable programming language or can be implemented in hardware. Additionally, and/or alternatively, the instructions can be executed in logically and/or virtually separate threads on processor(s) 212. The memory device(s) 214 can further store data that can be accessed by the processor(s) 212. For example, the data can include data indicative of power flows, current flows, temperatures, actual voltages, nominal voltages, gating commands, switching patterns, and/or any other data/or information described herein.

The control system 210 can also include a communication interface 216. The communication interface 216 can include suitable components for interfacing with one or more network(s), including for example, transmitters, receivers, ports, control devices, antennas, and/or other suitable components. For example, the communication interface 216 can be configured to communicate with a control system, such as a control system 210.

Although specific features of various embodiments can be shown in some drawings and not in others, this is for convenience only. In accordance with the principles of the present disclosure, any feature of a drawing can be referenced and/or claimed in combination with any feature of any other drawing.

This written description uses examples for the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electrical system for an aircraft having a gas turbine engine that includes a high pressure (HP) spool and a low pressure (LP) spool, the electrical system comprising:
   a power distribution bus;
   a first generator driven by the HP spool, the first generator being electrically coupled with the power distribution bus;
   a second generator driven by the LP spool, the second generator being electrically coupled with the power distribution bus;
   an electric propulsion fan having a fan and one or more motors for driving the fan, the one or more motors being electrically coupled with the power distribution bus;
   a secondary aircraft systems bus electrically coupled with one or more aircraft loads, the secondary aircraft systems bus also being electrically coupled with the power distribution bus; and
   a control system configured to manage a power split of electric power between the one or more motors of the electric propulsion fan and the secondary aircraft systems bus, the electric power managed in the power split between the one or more motors of the electric propulsion fan and the secondary aircraft systems bus being generated by the first generator and the second generator;
   a propulsion system controller (PSC);
   a bus power control unit (BPCU) controller communicatively coupled with the PSC;
   an auxiliary power unit;
   a first power converter electrically coupled with the first generator and the power distribution bus;
   a second power converter electrically coupled with the second generator and the power distribution bus;
   a third power converter electrically coupled with the one or more motors and the power distribution bus;
   a fourth power converter electrically coupled with the secondary aircraft systems bus and the power distribution bus;
   a fifth power converter electrically coupled with the auxiliary power unit and the power distribution bus;
   wherein power generated by the first generator and power generated from the second generator is delivered from the power distribution bus to the one or more motors for driving the fan and to the secondary aircraft systems bus;
   wherein the PSC controls the first power converter, the second power converter, and the third power converter to allocate electric power generated by the first generator and the second generator to the one or more motors in accordance with the power split;
   wherein the BPCU controller controls the fourth power converter to allocate electric power generated by the first generator and the second generator to the secondary aircraft systems bus in accordance with the power split; and
   wherein the PSC and/or the BPCU controller are configured to control the fifth power converter to allocate auxiliary electric power generated by the auxiliary power unit to supplement the electric power supplied by the first generator and the second generator to the one or more motors of the electric propulsion fan and the secondary aircraft systems bus in accordance with the power split.

2. The electrical system of claim 1, wherein the PSC is further configured to control the first power converter and the second power converter to allocate electric power between the first generator and the second generator.

3. The electrical system of claim 1, wherein the control system comprises:
   a full authority digital engine controller (FADEC) communicatively coupled with the BPCU controller and the PSC, the FADEC being operable to control operation of the gas turbine engine, and
   wherein the FADEC, the PSC, and the BPCU controller work together to command the first generator and the second generator to provide a required power for driving the fan of the electric propulsion fan and the one or more aircraft loads.

4. The electrical system of claim 1, wherein the electric power generated by the first generator and the second generator is allocated between the one or more motors of the electric propulsion fan and the secondary aircraft systems bus in accordance with the power split based on a phase of a flight envelope of the aircraft.

5. The electrical system of claim 1, wherein the electric power generated by the first generator and the second generator is allocated between the one or more motors of the electric propulsion fan and the secondary aircraft systems bus in accordance with the power split based on a load demand of the one or more aircraft loads.

6. The electrical system of claim 1, wherein the electric power generated by the first generator and the second generator is allocated between the one or more motors of the electric propulsion fan and the secondary aircraft systems bus in accordance with the power split based an emergency condition associated with the gas turbine engine.

7. An aircraft, comprising:
   a gas turbine engine that includes a high pressure (HP) spool, a low pressure (LP) spool, a first generator driven by the HP spool, and a second generator driven by the LP spool;

an electric propulsion fan having a fan and one or more motors for driving the fan;
one or more aircraft loads;
a secondary aircraft systems bus electrically coupled with the one or more aircraft loads;
a power distribution bus, the one or more motors, the first generator, the second generator, and the secondary aircraft systems bus being electrically coupled with the power distribution bus, wherein power generated by the first generator and power generated from the second generator is provided via the power distribution bus to the one or more motors for driving the fan and the secondary aircraft systems bus; and
a control system having one or more processors configured to:
manage a power split of electric power between the one or more motors of the electric propulsion fan and the secondary aircraft systems bus, the electric power managed in the power split between the one or more motors of the electric propulsion fan and the secondary aircraft systems bus being generated by the first generator and the second generators;
a propulsion system controller (PSC);
a bus power control unit (BPCU) controller communicatively coupled with the PSC;
an auxiliary power unit;
a first power converter electrically coupled with the first generator and the power distribution bus;
a second power converter electrically coupled with the second generator and the power distribution bus;
a third power converter electrically coupled with the one or more motors and the power distribution bus;
a fourth power converter electrically coupled with the secondary aircraft systems bus and the power distribution bus;
a fifth power converter electrically coupled with the auxiliary power unit and the power distribution bus;
wherein the PSC controls the first power converter, the second power converter, and the third power converter to allocate electric power generated by the first generator and the second generator to the one or more motors in accordance with the power split;
wherein the BPCU controller controls the fourth power converter to allocate electric power generated by the first generator and the second generator to the secondary aircraft systems bus in accordance with the power split; and
wherein the PSC and/or the BPCU controller are configured to control the fifth power converter to allocate auxiliary electric power generated by the auxiliary power unit to supplement the electric power supplied by the first generator and the second generator to the one or more motors of the electric propulsion fan and the secondary aircraft systems bus in accordance with the power split.

8. The aircraft of claim 7, wherein the PSC is further configured to control the first power converter and the second power converter to allocate electric power between the first generator and the second generator.

9. The aircraft of claim 7, wherein the control system comprises:
a full authority digital engine controller (FADEC) communicatively coupled with the BPCU controller and the PSC, the FADEC being operable to control operation of the gas turbine engine, and
wherein the FADEC, the PSC, and the BPCU controller work together to command the first generator and the second generator to provide a required power for driving the fan of the electric propulsion fan and the one or more aircraft loads.

10. The aircraft of claim 7, wherein the electric power generated by the first generator and the second generator is allocated between the one or more motors of the electric propulsion fan and the secondary aircraft systems bus in accordance with the power split based on a phase of a flight envelope of the aircraft.

11. The aircraft of claim 7, wherein the electric power generated by the first generator and the second generator is allocated between the one or more motors of the electric propulsion fan and the secondary aircraft systems bus in accordance with the power split based on a load demand of the one or more aircraft loads.

12. The aircraft of claim 7, wherein the electric power generated by the first generator and the second generator is allocated between the one or more motors of the electric propulsion fan and the secondary aircraft systems bus in accordance with the power split based an emergency condition associated with the gas turbine engine.

13. A method, comprising:
generating, by a first generator driven by a high pressure (HP) spool of a gas turbine engine mounted an aircraft, electric power;
generating, by a second generator driven by a low pressure (LP) spool of the gas turbine engine, electric power;
providing the electric power generated by the first generator and the second generator to a power distribution bus; and
managing a power split of electric power between one or more motors of an electric propulsion fan mounted to the aircraft and a secondary aircraft systems bus electrically coupled with one or more aircraft loads positioned offboard of the gas turbine engine, the electric power managed in the power split between the one or more motors of the electric propulsion fan and the secondary aircraft systems bus being generated by the first generator and the second generator and provided to the power distribution bus, wherein power generated by the first generator and power generated from the second generator is delivered from the power distribution bus to the one or more motors for driving the fan and to the secondary aircraft system bus;
wherein in managing the power split:
a propulsion system controller (PSC) controls a first power converter electrically coupled with the first generator and the power distribution bus, a second power converter electrically coupled with the second generator and the power distribution bus, and a third power converter electrically coupled with the one or more motors and the power distribution bus to allocate electric power generated by the first generator and the second generator to the one or more motors in accordance with the power split;
a bus power control unit (BPCU) controller communicatively coupled with the PSC controls a fourth power converter electrically coupled with the secondary aircraft systems bus and the power distribution bus to allocate electric power generated by the first generator and the second generator to the secondary aircraft systems bus in accordance with the power split; and
wherein the PSC and/or the BPCU controller are configured to control a fifth power converter to allocate auxiliary electric power generated by an auxiliary power unit to supplement the electric power supplied by the first generator and the second generator to the one or more motors of the electric propulsion fan and the secondary aircraft systems bus in accordance with the power split.

* * * * *